United States Patent [19]
Evans

[11] Patent Number: 5,832,703
[45] Date of Patent: Nov. 10, 1998

[54] TWIN ENGINE RIDING LAWN MOWER

[75] Inventor: Arthur Leon Evans, Coatesville, Ind.

[73] Assignee: Magic Circle Corporation, Coatesville, Ind.

[21] Appl. No.: 770,549

[22] Filed: Dec. 23, 1996

[51] Int. Cl.$^6$ ................................................. A01D 69/00
[52] U.S. Cl. ........................... 56/11.4; 56/11.6; 56/14.7; 56/DIG. 6; 180/53.6; 474/88; 474/166
[58] Field of Search ................... 56/11.4, 11.6, 56/11.8, 14.7, DIG. 4, DIG. 6; 180/53.6, 53.7, 53.8; 474/84, 88, 148, 150, 166

[56] References Cited

U.S. PATENT DOCUMENTS

| | | | |
|---|---|---|---|
| 2,366,646 | 1/1945 | Orr | 180/53.6 |
| 3,262,513 | 7/1966 | Henriksson et al. | 180/53.6 |
| 3,690,395 | 9/1972 | Spiller | 180/53.7 X |
| 4,131,170 | 12/1978 | van der Lely | 180/53.7 |
| 4,813,215 | 3/1989 | Chase et al. | 56/11.6 |

*Primary Examiner*—Terry Lee Melius
*Assistant Examiner*—Heather Shackelford
*Attorney, Agent, or Firm*—Jack Schuman

[57] ABSTRACT

A lawn mower is powered by two vertical shaft engines mounted on the chassis and equispaced about the longitudinal axis of the chassis. A vertical drive shaft is rotatably mounted on the longitudinal axis of the chassis. The outputs of both vertical shaft engines are transmitted through belts and pulleys to the vertical drive shaft, which is rotated by the combined outputs of both vertical shaft engines. Other pulleys are secured to the vertical drive shaft and connected through belting to pulleys which rotate grass-cutting blades and to pulleys which operate motors turning the driving wheels to propel the lawn mower.

10 Claims, 3 Drawing Sheets

5,832,703

TWIN ENGINE RIDING LAWN MOWER

BACKGROUND OF THE INVENTION

1. Field of the Invention

This invention relates, broadly speaking, to an improved lawn mower for cutting grass.

More particularly, this invention relates to a twin engine riding (i.e., equipped with a seat for the operator) lawn mower having an improved power drive.

2. Description of the Prior Art

Riding lawn mowers are well known and have long been used.

Mowing very large areas of grass, for example several acres in expanse, requires a riding lawn mower driven by a powerful engine in order to efficiently cut grass while travelling at substantial speeds.

Mowing such large areas of grass is frequently a commercial operation, in which the grass cutting contractor must move his equipment from one site, after the grass has been cut, to another site to be mowed.

Thus, commercial lawn mowing requires relocation of the grass cutting equipment by placing it on a trailer. There are practical limits to the width of commercial lawn mowers which, if exceeded, would require trailers of larger size than presently employed to relocate currently available commercial riding lawn mowers.

Engines which power commercial lawn mowers are fueled by gasoline, and are of the vertical shaft type so as to permit the lawn mower to have a width which is not excessive.

It would be most desirable, from the viewpoint of a commercial grass cutter who wants to be competitive and also to maintain profitability, to be able to achieve very fast cutting rates, for example approximately four acres of grass per hour. To attain such a goal, the commercial grass cutter would require his riding lawn mower to be powered by a very large gasoline-fueled vertical shaft engine, preferably of size in excess of 25 horsepower, the largest gasoline-fueled vertical shaft engine currently available.

Because gasoline-fueled vertical shaft engines suitable for mounting on the chassis of a riding lawn mower and larger than 25 horsepower do not exist, the commercial grass cutter is frustrated in his desire to achieve faster cutting speeds than presently attainable with existing equipment.

SUMMARY OF THE INVENTION

One of the objects of this invention is to provide a lawn mower having an improved power drive.

Another of the objects of this invention is to provide a riding lawn mower with an improved power drive and capable of very fast cutting speeds, and of width comparable with presently available lesser powered riding lawn mowers.

Other and further objects of this invention will become apparent by reference to the accompanying specification and drawings, and to the appended claims.

The foregoing objects are attained by providing on the chassis of a riding lawn mower a first gasoline-fueled vertical shaft engine having a first driving pulley secured to the shaft of said first engine and driving a first belt, a second gasoline-fueled vertical shaft engine having a second driving pulley secured to the shaft of said second engine and driving a second belt, a primary drive shaft rotatably mounted on said chassis and having secured thereto adjacent each other a first primary pulley and a second primary pulley, said first belt operatively engaging said first primary pulley and said second belt operatively engaging said second primary pulley, the said primary drive shaft being connected by suitable belting to other pulleys which, through rotatable shafts, operate the grass cutting blades and the means for propelling the mower. In this manner, the powers of the first and second vertical shaft engines are additive, and can exceed in output the largest vertical shaft engine currently available, thus permitting the riding lawn mower to rapidly and efficiently cut large areas of grass, and yet to have a width comparable with presently available lesser powered riding lawn mowers thereby facilitating the relocation of the equipment from one site to another on the same trailers now used for conventional riding lawn mowers.

DESCRIPTION OF THE DRAWINGS

Referring now to the drawings, in which like numerals represent like parts in the several views.

DESCRIPTION OF THE PREFERRED EMBODIMENT

Riding lawn mower 1 is seen as comprising chassis 2 having mounted thereon frame 3 and supporting in the conventional manner mowing deck 4.

Figure 1:
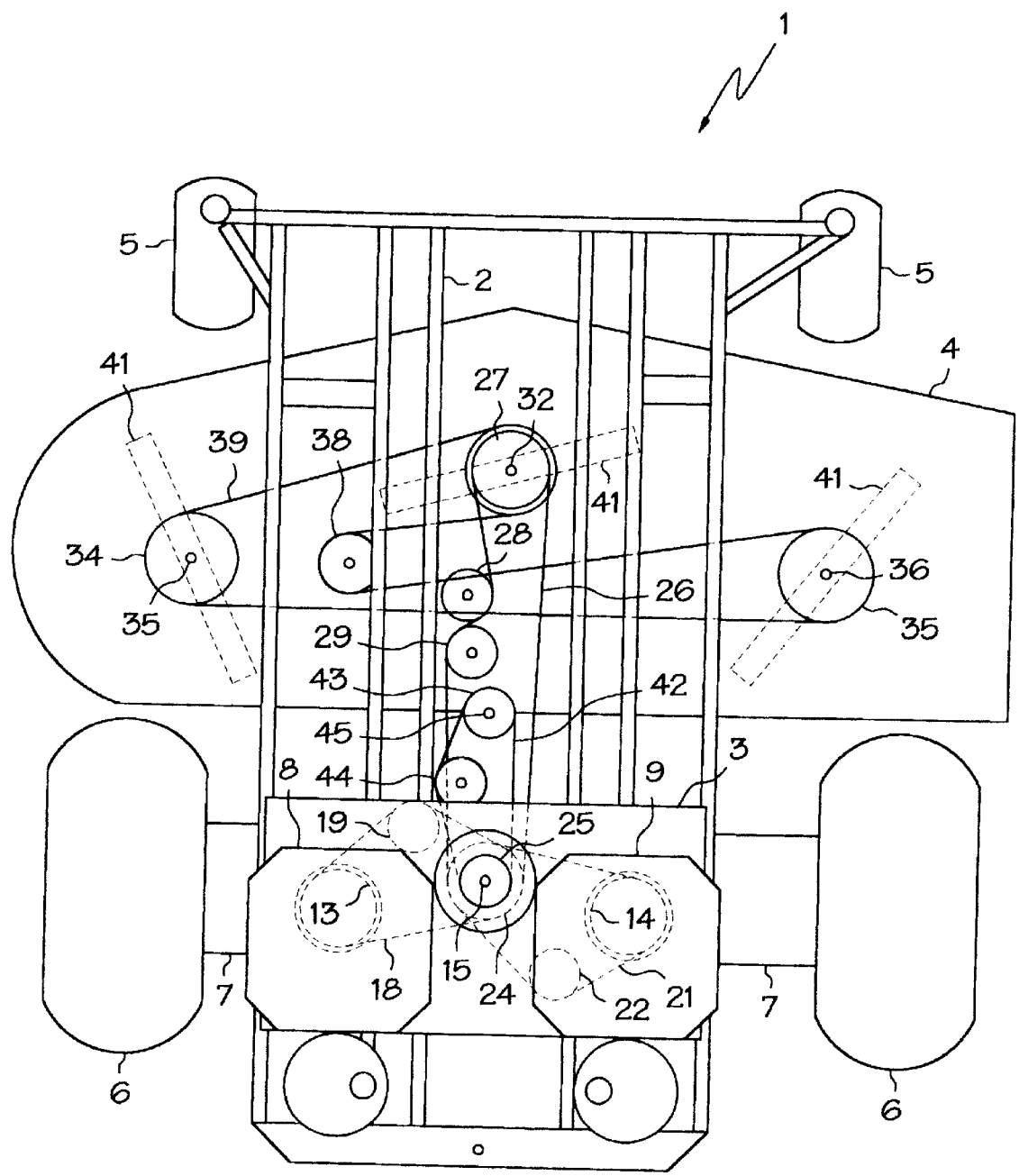
FIG. 1 represents a view in plan, partially diagrammatic. of a riding lawn mower incorporating the present invention.
Figure 2:
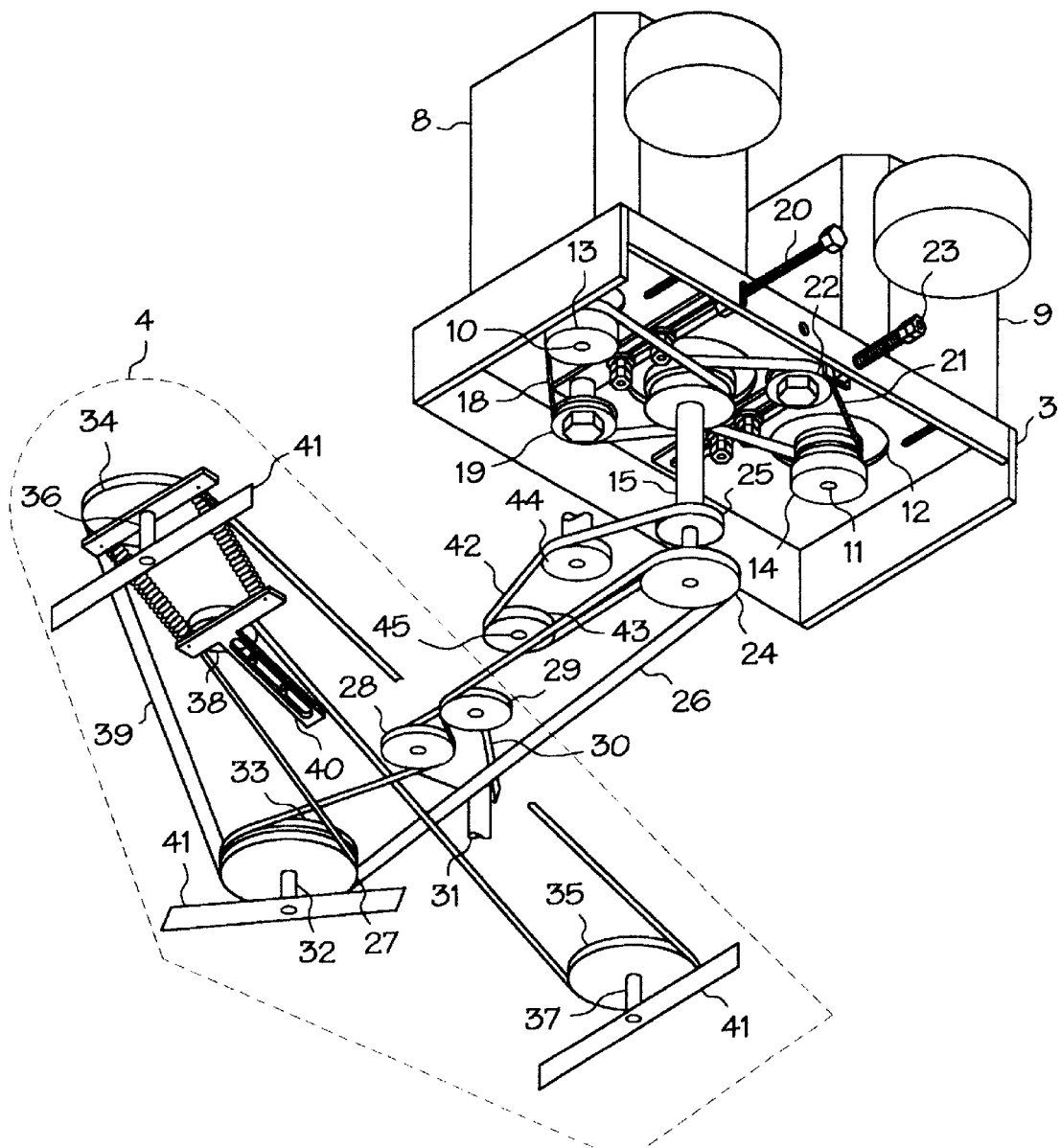
FIG. 2 represents a view in perspective, partially diagrammatic, of the riding lawn mower of FIG. 1, as seen from the underside, showing the arrangement of shafts. pulleys and belts, with some of the elements of FIG. 1 omitted for the purpose of clarity and to avoid obfuscating this figure.
Figure 3:
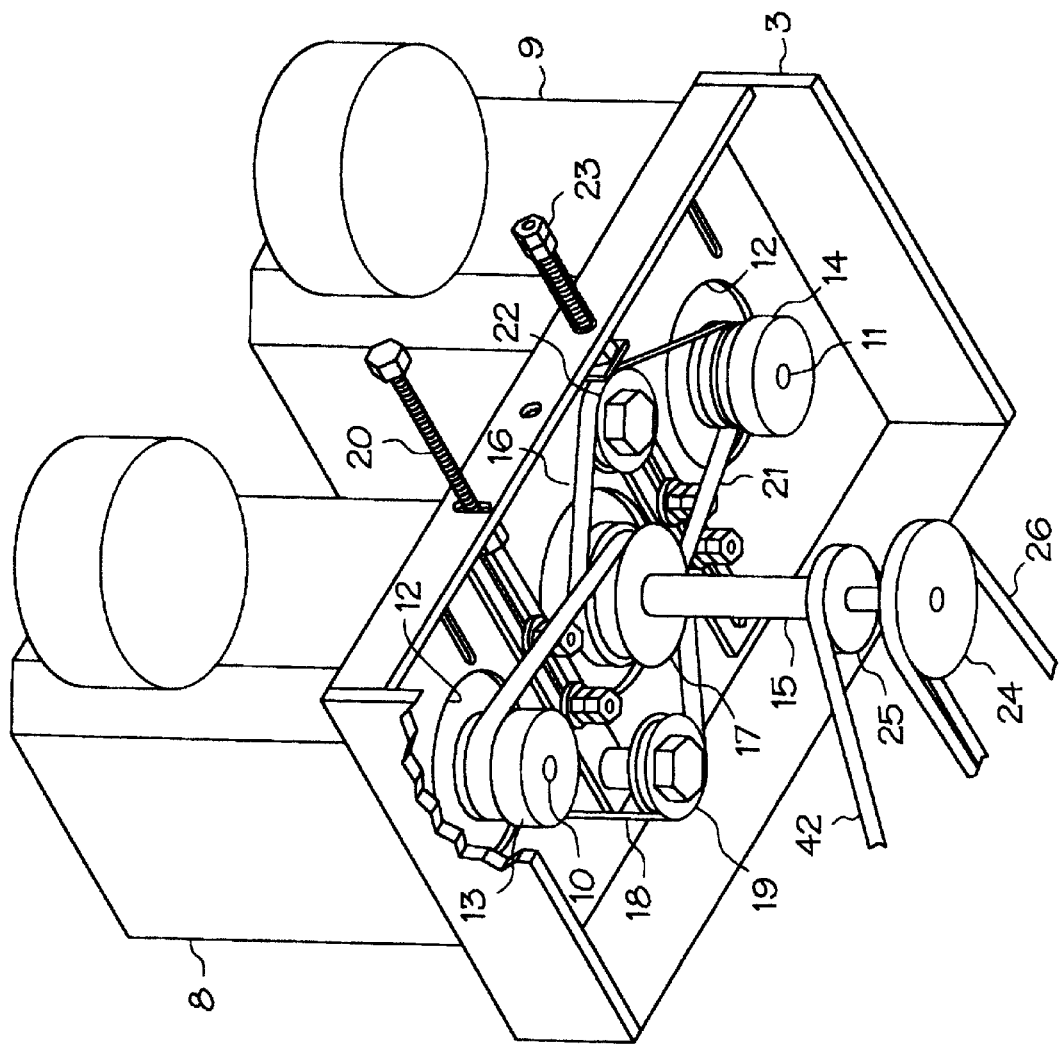
FIG. 3 represents an enlarged partial view in perspective of the driving system of shafts, pulleys and belts, as seen from the underside of the riding lawn mower of FIG. 1.

Caster wheels 5 are suitable mounted on the forward end of chassis 2, and independently operable driving wheels 6 are suitably mounted generally adjacent the rear end of chassis 2. In the preferred embodiment, driving wheels 6 are powered by independently operable conventional hydraulic motors 7 indicated diagrammatically in FIG. 1, whereby the velocity and direction of riding lawn mower 1 can be controlled by the operator.

Gasoline-fueled vertical shaft engines 8 and 9 are mounted on frame 3. These engines can be, but are not necessarily of, equal horsepower. and are equispaced about the longitudinal axis of chassis 2. The shafts 10 and 11 of engines 8 and 9, respectively, extend below the top plate of frame 3 through apertures 12 therein. Driving pulleys 13 and 14 are secured to shafts 10 and 11, respectively, adjacent the lower ends of said shafts.

Primary drive shaft 15 is, in a suitable manner, rotatably mounted to frame 3, preferably along the longitudinal axis of chassis 2. Secured to primary drive shaft 15 adjacent its upper end and adjacent to each other are belt-driven primary pulleys 16 and 17.

Belt 18 loops around and is operatively engaged with pulley 13, pulley 17 and tensioning pulley 19. Adjustment screw 20 is provided to adjust the position of tensioning pulley 19 relative to pulleys 13 and 17, thereby to adjust, as required, the tension in belt 18.

Belt 21 loops around and is operatively engaged with pulley 14, pulley 16 and tensioning pulley 22. Adjustment screw 23 is provided to adjust the position of tensioning pulley 22 relative to pulleys 14 and 16, thereby to adjust, as required, the tension in belt 21.

Belts 18 and 21 travel in the same direction around their respective pulleys 17 and 16. Therefore, the driving powers of engines 8 and 9 are additive. Thus, if engines 8 and 9 each have a maximum output of 20 horsepower, for example, their combined effect on primary drive shaft 15 can be equal to that of a 40 horsepower engine.

In the event that one of engines 8 or 9 requires servicing, lawn mower 1 can still be operated, although at reduced power, with the remaining engine and need not be taken totally out of service.

Primary drive shaft 15 is further provided with pulleys 24 and 25.

Belt 26 is looped around and operatively engages pulley 24, pulley 27, and snub pulleys 28 and 29. Snub pulleys 28 and 29 are rotatably mounted on triangular plate 30 which, in turn, is rotatably mounted on post 31. Post 31 is secured to mowing deck 4. Triangular plate 30 is linked, by means not shown, to a control station within the reach of the operator of lawn mower 1. Triangular plate 30, carrying snub pulleys 28 and 29, may be rotated by the operator of lawn mower 1, by means of the aforesaid linkage, about post 31 in one direction to tighten belt 26 around pulley 27 thereby transmitting to said pulley 27 the output of engines 8 and 9 delivered through belt 26 or, selectively at the discretion of the operator of lawn mower 1, in the opposite direction about post 31 thereby to loosen belt 26 around pulley 27 so that none of the output of engines 8 and 9 is transmitted to pulley 27.

Pulley 27 is secured to shaft 32 which, in turn, is mounted to mowing deck 4. Pulley 33 is also secured to shaft 32, adjacent pulley 27. Thus, when the output of engines 8 and 9 is applied through belt 26 to pulley 27 to rotate the said pulley 27 and shaft 32 to which it is secured, pulley 33 being secured to the same shaft 32 likewise will rotate in the same direction as pulley 27.

Pulleys 34 and 35 are rotatably mounted to shafts 36 and 37, respectively, which in turn are mounted to mowing deck 4 at opposite sides thereof. Tensioning pulley 38 is rotatably mounted to a shaft which in turn is mounted to mowing deck 4.

Belt 39 is looped around and operatively engages pulley 27, pulley 34, pulley 35, and tensioning pulley 38.

Tension adjustment means 40 are mounted to mowing deck 4, and can be adjusted in the conventional manner to adjust the position of tensioning pulley 38, thereby to adjust the tension in belt 39.

Cutting blades 41 are mounted to shafts 32, 36 and 37. It will be apparent that, when the output of engines 8 and 9 is transmitted through belt 26 to pulley 27 to rotate the said pulley 27 and the shaft 32 to which pulley 27 is secured, cutting blade 41 being secured to shaft 32 will be rotated to perform its grass cutting function. Pulley 33 being secured to the same shaft 32 likewise will be rotated, causing belt 39 to travel around and rotate pulleys 34 and 35 and shafts 36 and 37 to which said pulleys 34 and 35 are secured. Cutting blades 41 secured to shafts 36 and 37 will therefore be rotated to perform their grass cutting functions, all three cutting blades 41 rotating simultaneously.

Belt 42 is looped around and operatively engages pulley 25, pulley 43 and tensioning pulley 44. Tensioning means, not shown, are provided to adjust the tension in belt 42.

Pulley 43 is secured to shaft 45, the latter in turn connected, in the preferred embodiment, through suitable gearing to a hydraulic pump in turn connected through piping to independently operable hydraulic motors 7 which operate driving wheels 6. The aforesaid gearing, hydraulic pump and piping are not shown so as to simplify the drawings. Tensioning pulley 44 can be adjusted in position, through its tensioning means, under the control of the operator of lawn mower 1 while seated on the lawn mower 1.

The operation of lawn mower 1 will be apparent to those familiar with this art and who have read this specification.

It will be seen that the present invention offers the advantages of currently unavailable vertical shaft engines larger than 25 horsepower, with the added advantage of permitting the operator to use lawn mower 1 under reduced power if one of the two engines 8 or 9 is out of service.

In a typical apparatus having two gasoline-fueled vertical shaft engines 8 and 9 each rated at 20 horsepower, a mowing deck 4 of 72 inches in width with three cutting blades 41, cutting speeds of up to 10 miles per hour are attainable, permitting a cutting rate of approximately 4½ acres per hour.

Since modifications and changes which do not depart from the spirit of the invention as disclosed herein may readily occur to those skilled in the art to which this invention pertains, the appended claims should be construed as covering all suitable modifications and equivalents.

What is claimed is:

1. A lawn mower for cutting grass, said lawn mower comprising:
   (a) a chassis,
   (b) a first vertical shaft engine mounted on said chassis,
   (c) a second vertical shaft engine mounted on said chassis,
   (d) a vertical drive shaft rotatably mounted on said chassis,
   (e) first power transmission means connecting said first vertical shaft engine directly to said vertical drive shaft, said first power transmission means comprising:
      (i) a first driving pulley secured to the shaft of said first vertical shaft engine,
      (ii) a first driven pulley secured to said vertical drive shaft,
      (iii) a first drive belt engaging said first driving pulley and said first driven pulley,
   (f) second power transmission means connecting said second vertical shaft engine directly to said vertical drive shaft, said second power transmission means comprising:
      (i) a second driving pulley secured to the shaft of said second vertical shaft engine,
      (ii) a second driven pulley secured to said vertical drive shaft,
      (iii) a second drive belt engaging said second driving pulley and said second driven pulley,
   (g) said first and second driving belts simultaneously driving said first and second driven pulleys, respectively,
   (h) whereby said vertical drive shaft is rotated by the simultaneous combined outputs of said first and second vertical shaft engines,
   (i) grass-cutting means associated with said chassis,
   (j) third belt-driven power transmission means operatively connecting said vertical drive shaft to said grass-cutting means,
   (k) drive wheels rotatably mounted to said chassis,
   (l) motor means to rotate said drive wheels,
   (m) fourth belt-driven power transmission means operatively connecting said vertical drive shaft to said motor means to rotate said drive wheels and propel said lawn mower.

2. A lawn mower as in claim 1, further comprising:

(m) a mowing deck supported from said chassis, and wherein:

(n) said grass-cutting means is rotatably mounted to said mowing deck.

3. A lawn mower as in claim 1, wherein:

(m) said first and second vertical shaft engines are horizontally spaced from each other.

4. A lawn mower as in claim 1, wherein:

(m) said first and second vertical shaft engines are of equal horsepower.

5. A lawn mower as in claim 1, wherein:

(m) said first and second vertical shaft engines rotate said vertical drive shaft in the same direction.

6. A lawn mower as in claim 1, wherein:

(m) said chassis has a longitudinal axis, (n) said first and second vertical shaft engines are mounted to said chassis on opposite sides of said longitudinal axis.

7. A lawn mower as in claim 1, wherein:

(m) said chassis has a longitudinal axis, (n) said vertical drive shaft is rotatably mounted to said chassis on the said longitudinal axis.

8. A lawn mower as in claim 6, wherein:

(o) said vertical drive shaft is rotatably mounted to said chassis on the said longitudinal axis.

9. A lawn mower as in claim 6, wherein:

(o) said first and second vertical shaft engines are equispaced about said longitudinal axis.

10. A lawn mower as in claim 9, wherein:

(p) said vertical drive shaft is rotatably mounted to said chassis on the said longitudinal axis.

\* \* \* \* \*